US010494106B2

(12) United States Patent
Sabnis et al.

(10) Patent No.: US 10,494,106 B2
(45) Date of Patent: Dec. 3, 2019

(54) ENVIRONMENTAL COOLING SYSTEMS FOR AIRCRAFT

(71) Applicant: United Technologies Corporation, Farmington, CT (US)

(72) Inventors: Jayant Sabnis, Glastonbury, CT (US); Louis J. Bruno, Ellinglon, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 643 days.

(21) Appl. No.: 15/151,938

(22) Filed: May 11, 2016

(65) Prior Publication Data

US 2016/0332737 A1 Nov. 17, 2016

Related U.S. Application Data

(60) Provisional application No. 62/159,421, filed on May 11, 2015.

(51) Int. Cl.
*B64D 13/06* (2006.01)
*F02C 6/08* (2006.01)
*F02C 9/18* (2006.01)

(52) U.S. Cl.
CPC ............... *B64D 13/06* (2013.01); *F02C 6/08* (2013.01); *F02C 9/18* (2013.01); *F05D 2220/32* (2013.01)

(58) Field of Classification Search
CPC ...... B64D 13/00; B64D 13/006; B64D 13/02; B64D 13/06; B64D 13/04; B64D 2013/0603; B64D 2013/0618; B64D 2013/064; B64D 2013/0648; F02C 9/18; Y02T 50/56

See application file for complete search history.

(56) References Cited

U.S. PATENT DOCUMENTS

| 4,735,056 A | | 4/1988 | Goodman | |
|---|---|---|---|---|
| 5,114,103 A | * | 5/1992 | Coffinberry | B64C 21/06 244/209 |
| 5,967,461 A | * | 10/1999 | Farrington | B64D 13/06 244/118.5 |
| 7,210,653 B2 | * | 5/2007 | Atkey | B64D 13/06 244/58 |
| 10,054,051 B2 | * | 8/2018 | Foutch | F02C 7/047 |

(Continued)

FOREIGN PATENT DOCUMENTS

GB 1083573 A 9/1967

OTHER PUBLICATIONS

European Search Report for application EP 16169218.1, dated Oct. 20, 2016, 7 pages.

*Primary Examiner* — Benjamin P Lee
(74) *Attorney, Agent, or Firm* — Cantor Colburn LLP

(57) ABSTRACT

An environmental control system (ECS) for a multi-engine aircraft includes a controller configured to switch the ECS between a plurality of operating modes. The plurality of operating modes includes a first operating mode configured to receive bleed air from each engine of the aircraft in a first environmental condition, wherein the pressure of the bleed air is about equal from each engine. The plurality of operating modes includes a second operating mode configured to receive bleed air from at least one engine of the aircraft in a second environmental condition, wherein the pressure of the bleed air is different between at least two engines.

16 Claims, 4 Drawing Sheets

(56) References Cited

U.S. PATENT DOCUMENTS

| | | |
|---|---|---|
| 2006/0174628 A1 | 8/2006 | Mikhail |
| 2009/0117840 A1 | 5/2009 | Kresser et al. |
| 2013/0151039 A1 | 6/2013 | Haillot |
| 2015/0275769 A1* | 10/2015 | Foutch ............... F02C 9/18 60/776 |
| 2016/0146114 A1* | 5/2016 | Bruno ................ F02C 9/18 417/53 |
| 2017/0106985 A1* | 4/2017 | Stieger ............ B64D 13/06 |
| 2017/0349290 A1* | 12/2017 | Linert ............. B64D 13/06 |
| 2018/0050809 A1* | 2/2018 | Colavincenzo ...... B64D 31/12 |

\* cited by examiner

ENVIRONMENTAL COOLING SYSTEMS FOR AIRCRAFT

CROSS REFERENCE TO RELATED APPLICATIONS

This application claims the benefit of U.S. Provisional Patent Application Ser. No. 62/159,421 filed on May 11, 2015, the entire contents of which are incorporated herein by reference thereto.

BACKGROUND

1. Field

The present disclosure relates to environmental cooling systems (ECS) for aircraft, more specifically to systems for providing suitable air bleeding pressure.

2. Description of Related Art

Traditional environmental control systems (ECS) bleed air from compressors at high pressure bleed ports. The bleed port locations are selected to ensure that, under all flight conditions, suitable cabin pressures can be achieved. This means that on very hot days at very high altitudes, the locations from which bleed air is drawn will always be sufficient to supply suitable pressure. However, this also means that, under all other flight conditions which comprise the overwhelming majority of flight time, an unnecessary amount of pressure is being bled from the engines which reduces thrust specific fuel consumption.

Such conventional methods and systems have generally been considered satisfactory for their intended purpose. However, there is still a need in the art for improved environmental control systems. The present disclosure provides a solution for this need.

SUMMARY

In accordance with at least one aspect of this disclosure, an environmental control system (ECS) for a multi-engine aircraft includes a controller configured to switch the ECS between a plurality of operating modes. The plurality of operating modes includes a first operating mode configured to receive bleed air from each engine of the aircraft in a first environmental condition, wherein the pressure of the bleed air is about equal from each engine. The plurality of operating modes includes a second operating mode configured to receive bleed air from at least one engine of the aircraft in a second environmental condition, wherein the pressure of the bleed air is different between at least two engines.

In any of the foregoing embodiments, the controller can be operatively connected to a thrust controller to cause engine thrust to increase in at least one engine and to reduce thrust from at least one other engine to maintain a constant total thrust when the ECS is in the second operating mode. In any of the foregoing embodiments, bleed air from at least one engine (e.g., the engines with reduced thrust) can shut off in the second environmental condition.

In any of the foregoing embodiments, the controller can be operatively connected to the thrust controller to increase or reduce thrust symmetrically to prevent asymmetric thrust induced yaw. In any of the foregoing embodiments, the system may additionally and/or alternatively include a plurality of ECS packs, each ECS pack connected to a respective one of the engines. In any of the foregoing embodiments, at least one of the plurality of ECS packs can be a mode changing ECS pack that is operative to change from a first cooling mode in the first operational mode to a second cooling mode in the second operational mode. In any of the foregoing embodiments, the second cooling mode can allow the ECS pack to operate with higher bleed air pressure than the first cooling mode.

In any of the foregoing embodiments, the plurality of ECS packs may additionally and/or alternatively include two mode changing packs connected to symmetric engines, and wherein two single mode ECS packs are connected to the remaining engines. In any of the foregoing embodiments, each ECS pack may additionally and/or alternatively include a heat exchanger operative to cool the bleed air. In any of the foregoing embodiments, the single mode ECS packs can be configured to shut off bleed air from their respective engines when the ECS is in the second operating mode.

In accordance with at least one aspect of this disclosure, an aircraft can include a plurality of engines and an ECS as described in any of the foregoing embodiments above.

In accordance with at least one aspect of this disclosure, a method for supplying pressurized air to an aircraft includes bleeding bleed air from a portion of a turbomachine of the aircraft and increasing a thrust output of the turbomachine to increase a pressure of the bleed air in a predetermined environmental condition. In any of the foregoing embodiments, the turbomachine can be a first turbomachine and the method can further include reducing a thrust output of a second turbomachine of the aircraft to maintain a constant total thrust. In any of the foregoing embodiments, increasing the thrust output can include increasing the thrust output of a first turbomachine and a second turbomachine that is symmetrically located relative to the first turbomachine. In any of the foregoing embodiments, the thrust output of the first and second turbomachines can be increased by about an equal amount to prevent asymmetric thrust induced yaw, e.g., in a four engine system.

In any of the foregoing embodiments, the method may additionally and/or alternatively include reducing a thrust output of a third turbomachine of the aircraft to maintain a constant total thrust. In any of the foregoing embodiments, reducing the thrust output may additionally and/or alternatively include reducing the thrust output of fourth turbomachine that is symmetrically located relative to the third turbomachine to prevent asymmetric thrust induced yaw.

In any of the foregoing embodiments, the method may additionally and/or alternatively include switching modes of an environmental control system (ECS) from a first operating mode configured to receive bleed air from each engine of the aircraft in a first environmental condition, wherein the pressure of the bleed air is about equal from each engine, to a second operating mode configured to receive bleed air from at least one engine of the aircraft in a second environmental condition, wherein the pressure of the bleed air is different between at least two engines. In any of the foregoing embodiments, switching modes of the ECS may additionally and/or alternatively include switching at least one ECS pack from a first cooling mode to a second cooling mode. In any of the foregoing embodiments, switching modes of the ECS may additionally and/or alternatively include maintaining a constant cooling mode in at least one ECS pack.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
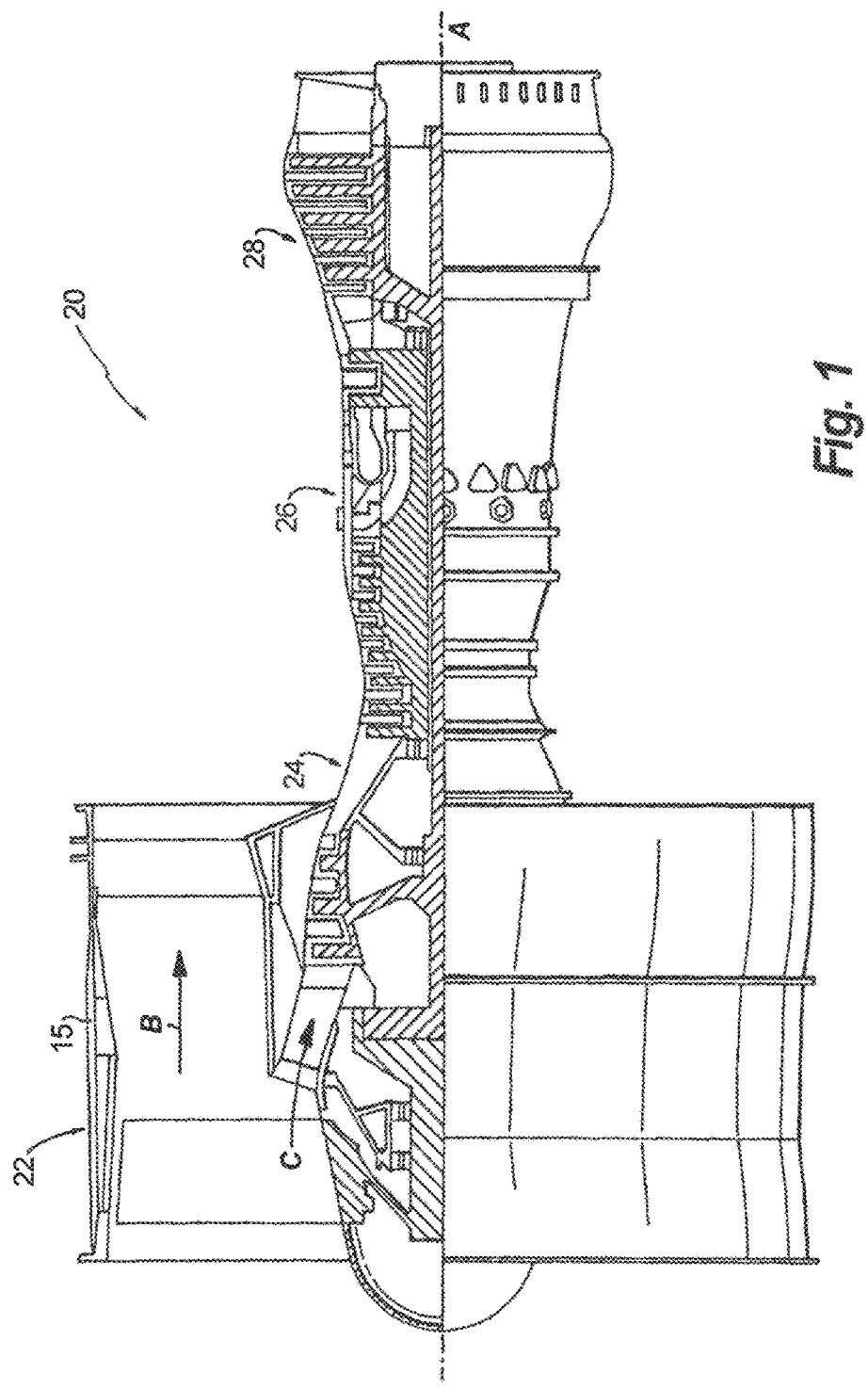
FIG. 1 is a schematic view of an embodiment of a turbomachine in accordance with this disclosure.
Figure 2A:
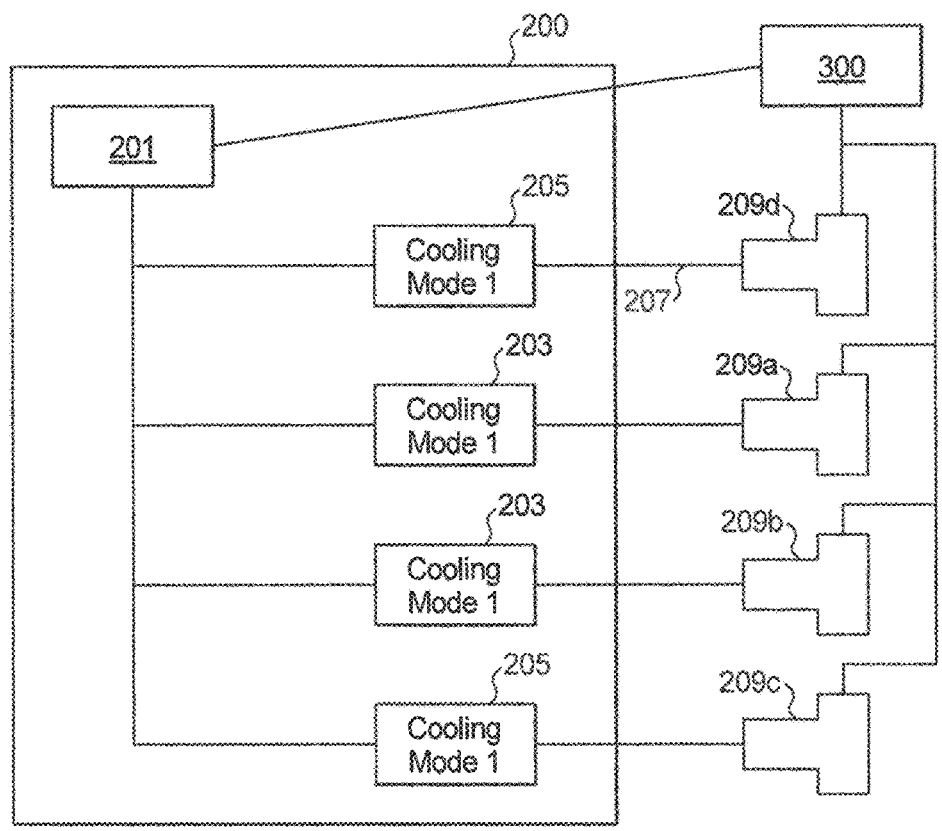
FIG. 2A is a schematic view of an embodiment of an environmental control system in accordance with this disclosure, showing the system in a first operating mode.
Figure 2B:
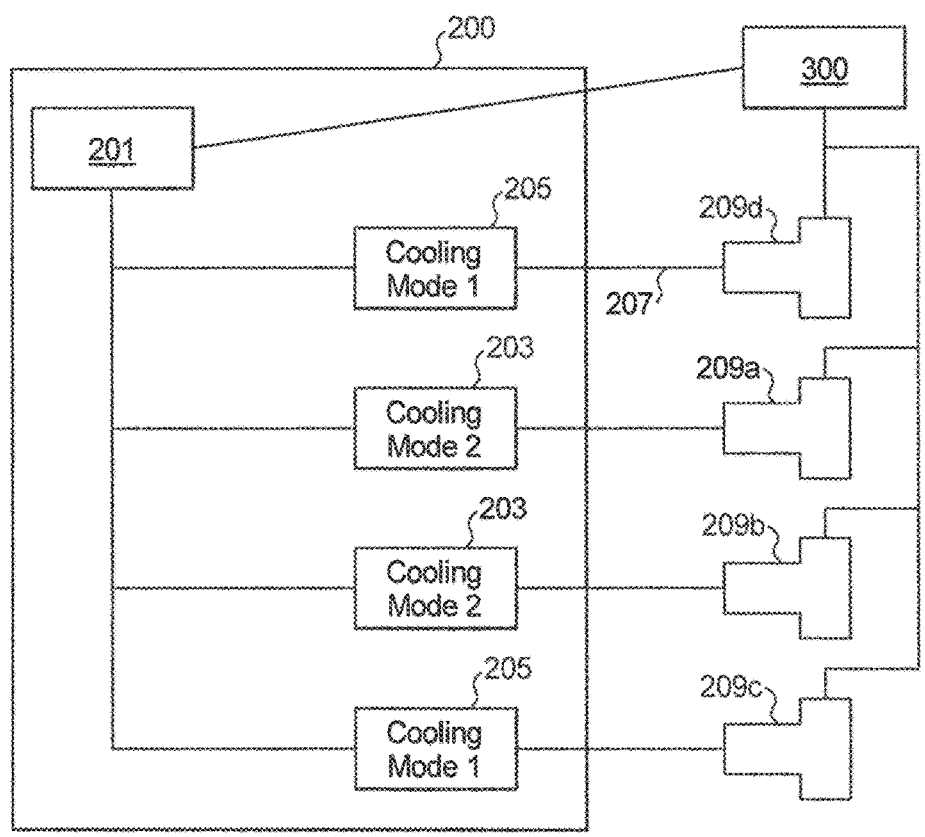
FIG. 2B is a schematic view of the environmental control system of FIG. 2A, showing the system in a second operating mode.

Reference will now be made to the drawings wherein like reference numerals identify similar structural features or aspects of the subject disclosure. For purposes of explanation and illustration, and not limitation, an illustrative view of an embodiment of an environmental control system in accordance with the disclosure is shown in FIG. 2A and is designated generally by reference character 200. Other embodiments and/or aspects of this disclosure are shown in FIGS. 1 and 2B. The systems and methods described herein can be used to improve the efficiency of environmental control systems.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

Referring to FIGS. 2A and 2B, an environmental control system (ECS) 200 for a multi-engine aircraft includes a controller 201 configured to switch the ECS 200 between a plurality of operating modes. The controller 201 can include any suitable hardware and/or software configured to change modes of the ECS 200 as is understood by those having ordinary skill in the art.

The plurality of operating modes includes a first operating mode (e.g., as shown in FIG. 2A) such that the ECS 200 is configured to receive bleed air from each engine 209a, 209b, 209c, 209d of the four-engine aircraft in a first environmental condition and where the pressure of the bleed air is about equal from each engine 209a, 209b, 209c, 209d. For purposes of clarity, engines 209a and 209b are physically closer to the aircraft fuselage than engines 209c and 209d, which is why the engines are shown in FIGS. 2A and 2B as being in the order of 209d, 209a, 209b, 209c. The plurality of operating modes also includes a second operating mode (e.g., as shown in FIG. 2B) such that the ECS 200 is configured to receive bleed air from at least one engine 209a, 209b of the aircraft in a second environmental condition and where the pressure of the bleed air is different between at least two engines (e.g., engine 209a can provide higher pressure bleed whereas engine 209c can provide no bleed air or reduced pressure bleed air).

Referring to FIG. 2B, the controller 201 can be operatively connected to a thrust controller 300. The thrust controller 300 can be any suitable controller (e.g., a throttle mechanism, a full authority digital engine control (FADEC)) that can connect to each engine 209a, 209b, 209c, 209d and can control the thrust of each engine 209a, 209b, 209c, 209d, as is understood by those having ordinary skill in the art.

The controller 201 can command the thrust controller 300 to cause engine thrust to increase in at least one engine (e.g., engines 209a, 209b) when the ECS 200 is in the second operating mode. Similarly, the controller 201 can command the thrust controller 300 to reduce thrust from at least one other engine (e.g., engines 209c, 209d) to maintain a constant total thrust when the ECS 200 is in the second operating mode. Thus, to prevent increasing airspeed, and/or to prevent over pressurization, and/or to prevent changing flight configuration (with respect to lift, thrust, and speed), thrust must be reduced in an equal amount (e.g., in engines 209c, 209d) to the amount that thrust in increased in the at least one engine (e.g., engines 209a, 209b).

As shown, the controller 201 can command the thrust controller 300 to increase or reduce thrust symmetrically to prevent asymmetric thrust induced yaw. For example, engines 209a and 209b can increase thrust in about equal amounts and/or engines 209c and 209d can reduce thrust in about equal amounts which would prevent or reduce yaw from asymmetric thrust. It is also contemplated that the thrust can be asymmetrically modified inducing a yaw, and/or that the controller 201 can communicate with a flight control system (not shown) to trim the rudder automatically to the required amount. It is contemplated that even in the rudder trimmed scenario, e.g., for a two engine aircraft, that the overall efficiency of the system will be improved because of how relatively little time in that scenario would be required when compared to the total operating time of the aircraft.

The system 200 can further include a plurality of ECS packs 203, 205, each ECS pack 203, 205 is connected to an engine 209a, 209b, 209c, 209d through a suitable fluid circuit 207. Each ECS pack 203, 205 also connects to the aircraft (e.g., the cabin and/or the cockpit) to supply pressurized and/or cooled air thereto (this connection is not shown in the drawings). As shown, at least one of the plurality of ECS packs 203, 205 can be a mode changing ECS pack 203 that is operative to change from a first cooling mode in the first operational mode (e.g., as shown in FIG. 2A) to a second cooling mode in the second operational mode (e.g., as shown in FIG. 2B).

The second cooling mode can allow each mode changing ECS pack 203 to operate with higher bleed air pressure than the first cooling mode such that an increase in thrust (and thus bleed air pressure) from an engine (e.g., engines 209a, 209b) can be tolerated. For example, in the second cooling mode, each mode changing ECS pack 203 can draw bleed air from the high pressure compressor (either independently of a low pressure compressor bleed or in conjunction therewith). In conjunction therewith, each single mode ECS pack can shut off bleed flow from their respective engine to maintain suitable total pressure within the ECS 200.

As shown, the controller 201 can be operatively connected to the mode changing ECS packs 203 to communicate with the ECS packs 203 and/or to cause the ECS packs 203 to change between cooling modes. While a single controller 201 is shown separate from the ECS packs 203, it is contemplated that the controller 201 can be an internal component of each mode changing ECS pack 203 and/or that multiple controllers 201 can exist (e.g., a controller 201 for each ECS pack 203). The controller 201 can change the operating mode of the ECS 200 by virtue of changing the cooling mode of one or more of the ECS packs 203 as is understood by those skilled in the art (e.g., opening a high pressure bleed valve) and/or by modifying engine thrust of suitable engines (e.g., engines 209a, 209b).

As shown, the ECS 200 for a four engine aircraft can be arranged such that the plurality of ECS packs 203, 205 can include two mode changing packs 203 connected to symmetric engines 209a, 209b and two single mode ECS packs 205 connected to the remaining engines. While a four engine aircraft system is depicted, it is contemplated that a system of any suitable number of engines can be utilized (e.g., two or three engine aircraft).

Each ECS pack 203, 205 can include a heat exchanger (not shown) operative to cool the bleed air. Any other suitable components can be included as is understood by those having ordinary skill in the art.

In certain embodiments, the mode change ECS packs 203 can be configured to switch from the first cooling mode to the second cooling mode automatically based on at least one engine operating parameter. The at least one engine operating parameter can include bleed air pressure, engine speed, or any other suitable parameter.

In certain embodiments, the mode change ECS packs 203 can be configured to switch from the first cooling mode to the second cooling mode automatically based on at least one environmental condition. For example, the at least one environmental condition can include atmospheric air temperature, atmospheric air pressure, atmospheric air density, or a predetermined altitude.

Figure 3:
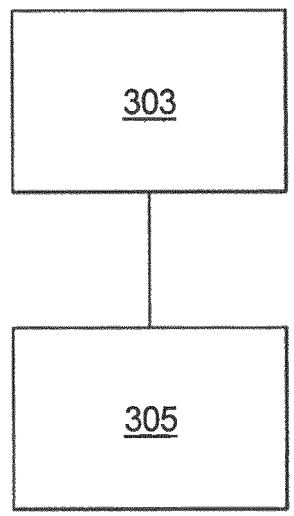
FIG. 3 is a flow chart of an embodiment of a method in accordance with this disclosure.

Referring additionally to FIG. 3, a method 301 for supplying pressurized air to an aircraft includes bleeding bleed air (e.g., block 303) from a portion of a turbomachine (e.g., engine 209a or 209b) of the aircraft and increasing a thrust output (e.g., block 305) of the turbomachine (e.g., engine 209a or 209b) to increase a pressure of the bleed air in a predetermined environmental condition. The turbomachine can be a first turbomachine (e.g., engine 209a or 209b) and the method can further include reducing a thrust output of a second turbomachine (e.g., engine 209c or 209d) of the aircraft to maintain a constant total thrust.

Increasing the thrust output can include increasing the thrust output of a first turbomachine (e.g., engine 209a) and a second turbomachine (e.g., engine 209b) that is symmetrically located relative to the first turbomachine (e.g., engine 209a). The thrust output of the first and second turbomachines can be increased by about an equal amount to prevent asymmetric thrust induced yaw. It is also contemplated that an uneven increase in output thrust can be created and the yaw induced thereby offset by other suitable aircraft systems (e.g., the rudder input).

The method can further include reducing a thrust output of a third turbomachine (e.g., engine 209c) of the aircraft to maintain a constant total thrust. Reducing the thrust output can include reducing the thrust output of a fourth turbomachine (e.g., engine 209d) that is symmetrically located relative to the third turbomachine (e.g., engine 209c) to prevent asymmetric thrust induced yaw.

The method can further include switching modes of an environmental control system (ECS) 200 from a first operating mode as described above, to a second operating mode as described above. Switching modes of the ECS 200 can include switching at least one mode changing ECS pack 203 from a first cooling mode to a second cooling mode. Switching modes of the ECS 200 can include maintaining a constant cooling mode in at least one ECS pack 205. Alternatively or additionally, switching modes can include shutting off bleed air from the engines connected to the single mode ECS packs 205 using the ECS packs 205 or any other suitable mechanism/valve associated therewith.

The above systems and methods allow for bleed location to be selected at lower pressure portions of each engine which increases the efficiency of the ECS system 200 because unnecessary pressure is not being used all the time. In the small percentage of flight operations when a higher pressure is needed to be produced due to environmental conditions, such as on a hot day at high altitudes, one or more of the engines can increase thrust to provide the proper amount of bleed pressure.

The methods and systems of the present disclosure, as described above and shown in the drawings, provide for improved environmental control systems with superior properties including improved efficiency. While the apparatus and methods of the subject disclosure have been shown and described with reference to embodiments, those skilled in the art will readily appreciate that changes and/or modifications may be made thereto without departing from the scope of the subject disclosure.

What is claimed is:

1. An environmental control system (ECS) for a multi-engine aircraft, comprising:
    a controller configured to switch the ECS between a plurality of operating modes, the plurality of operating modes comprising:
    a first operating mode configured to receive bleed air from each engine of the aircraft in a first environmental condition, wherein the pressure of the bleed air is about equal from each engine; and
    a second operating mode configured to receive bleed air from at least one engine of the aircraft in a second environmental condition, wherein the pressure of the bleed air is different between at least two engines,
    wherein the controller is operatively connected to a thrust controller to cause engine thrust to increase in at least one engine and to reduce thrust from at least one other engine to maintain a constant total thrust when the ECS is in the second operating mode.

2. The system of claim 1, wherein bleed air from at least one engine is shut off in the second environmental condition.

3. The system of claim 1, wherein the controller is operatively connected to the thrust controller to increase or reduce thrust symmetrically to prevent asymmetric thrust induced yaw.

4. The system of claim 1, further comprising a plurality of ECS packs, each ECS pack connected to a respective one of the engines, wherein at least one of the plurality of ECS packs is a mode changing ECS pack that is operative to change from a first cooling mode in the first operational mode to a second cooling mode in the second operational mode, wherein the second cooling mode allows the ECS pack to operate with higher bleed air pressure than the first cooling mode.

5. The system of claim 4, wherein each ECS pack includes a heat exchanger operative to cool the bleed air.

6. The system of claim 4, wherein the plurality of ECS packs includes two mode changing packs connected to symmetric engines, and wherein two single mode ECS packs are connected to the remaining engines.

7. The system of claim 6, wherein the single mode ECS packs are configured to shut off bleed air from their respective engines when the ECS is in the second operating mode.

8. An aircraft, comprising:
a plurality of engines; and
an environmental control system (ECS), comprising:
a controller configured to switch the ECS between a plurality of operating modes, the plurality of operating modes comprising:
a first operating mode configured to receive bleed air from each engine of the aircraft in a first environmental condition, wherein the pressure of the bleed air is about equal from each engine; and
a second operating mode configured to receive bleed air from at least one engine of the aircraft in a second environmental condition, wherein the pressure of the bleed air is different between at least two engines,
wherein the controller is operatively connected to a thrust controller to cause engine thrust to increase in at least one engine and to reduce thrust from at least one other engine to maintain a constant total thrust when the ECS is in the second operating mode.

9. The aircraft of claim 8, wherein bleed air from at least one engine is shut off in the second environmental condition.

10. An environmental control system (ECS) for a multi-engine aircraft, comprising:
a controller configured to switch the ECS between a plurality of operating modes, the plurality of operating modes comprising:
a first operating mode configured to receive bleed air from each engine of the aircraft in a first environmental condition, wherein the pressure of the bleed air is about equal from each engine;
a second operating mode configured to receive bleed air from at least one engine of the aircraft in a second environmental condition, wherein the pressure of the bleed air is different between at least two engines; and
a plurality of ECS packs, each ECS pack connected to a respective one of the engines, wherein at least one of the plurality of ECS packs is a mode changing ECS pack that is operative to change from a first cooling mode in the first operational mode to a second cooling mode in the second operational mode, wherein the second cooling mode allows the ECS pack to operate with higher bleed air pressure than the first cooling mode.

11. The system of claim 10, wherein the controller is operatively connected to a thrust controller to cause engine thrust to increase in at least one engine and to reduce thrust from at least one other engine to maintain a constant total thrust when the ECS is in the second operating mode.

12. The system of claim 10, wherein bleed air from at least one engine is shut off in the second environmental condition.

13. The system of claim 11, wherein the controller is operatively connected to the thrust controller to increase or reduce thrust symmetrically to prevent asymmetric thrust induced yaw.

14. The system of claim 10, wherein each ECS pack includes a heat exchanger operative to cool the bleed air.

15. The system of claim 10, wherein the plurality of ECS packs includes two mode changing packs connected to symmetric engines, and wherein two single mode ECS packs are connected to the remaining engines.

16. The system of claim 15, wherein the single mode ECS packs are configured to shut off bleed air from their respective engines when the ECS is in the second operating mode.

* * * * *